United States Patent

[11] 3,586,355

| [72] | Inventor | Hugo Magi |
| | | Etobicoke, Ontario, Canada |
| [21] | Appl. No. | 790,600 |
| [22] | Filed | Jan. 13, 1969 |
| [45] | Patented | June 22, 1971 |
| [73] | Assignee | Dominion Auto Accessories Limited |
| | | Toronto, Ontario, Canada |

[54] HINGE JOINT ASSEMBLIES
8 Claims, 4 Drawing Figs.

[52] U.S. Cl. .................................................. 287/14
[51] Int. Cl. ...................................................... F16c 11/10
[50] Field of Search ........................................ 287/14, 92,
101; 248/478; 64/29, 28, ; 74/501 P; 297/374

[56] References Cited
UNITED STATES PATENTS

| 2,539,630 | 1/1951 | Kruger et al. | 64/28 |
| 2,848,883 | 8/1958 | Dallolio | 64/29 |
| 3,103,800 | 9/1963 | Kantar | 74/P |

FOREIGN PATENTS

| 1,345,146 | 10/1963 | France | 16/140 |
| 555,482 | 6/1923 | France | 287/92 |

*Primary Examiner*—David J. Williamowsky
*Assistant Examiner*—Andrew V. Kundrat
*Attorney*—Sim & McBurney ABSTRACT: A hinge joint assembly for pivotally connecting two structural members together. The assembly includes two lock members, one connected to each structural member. One lock member has teeth extending radially inwardly toward the pivot axis of the two structural members, and the other lock member has teeth extending radially outwardly from the pivot axis to mesh with the radially inwardly extending teeth. The lock members can be turned with respect to one another provided sufficient torque is exerted to overcome the mechanical interference between the teeth, thus changing the relative orientation between the structural members.

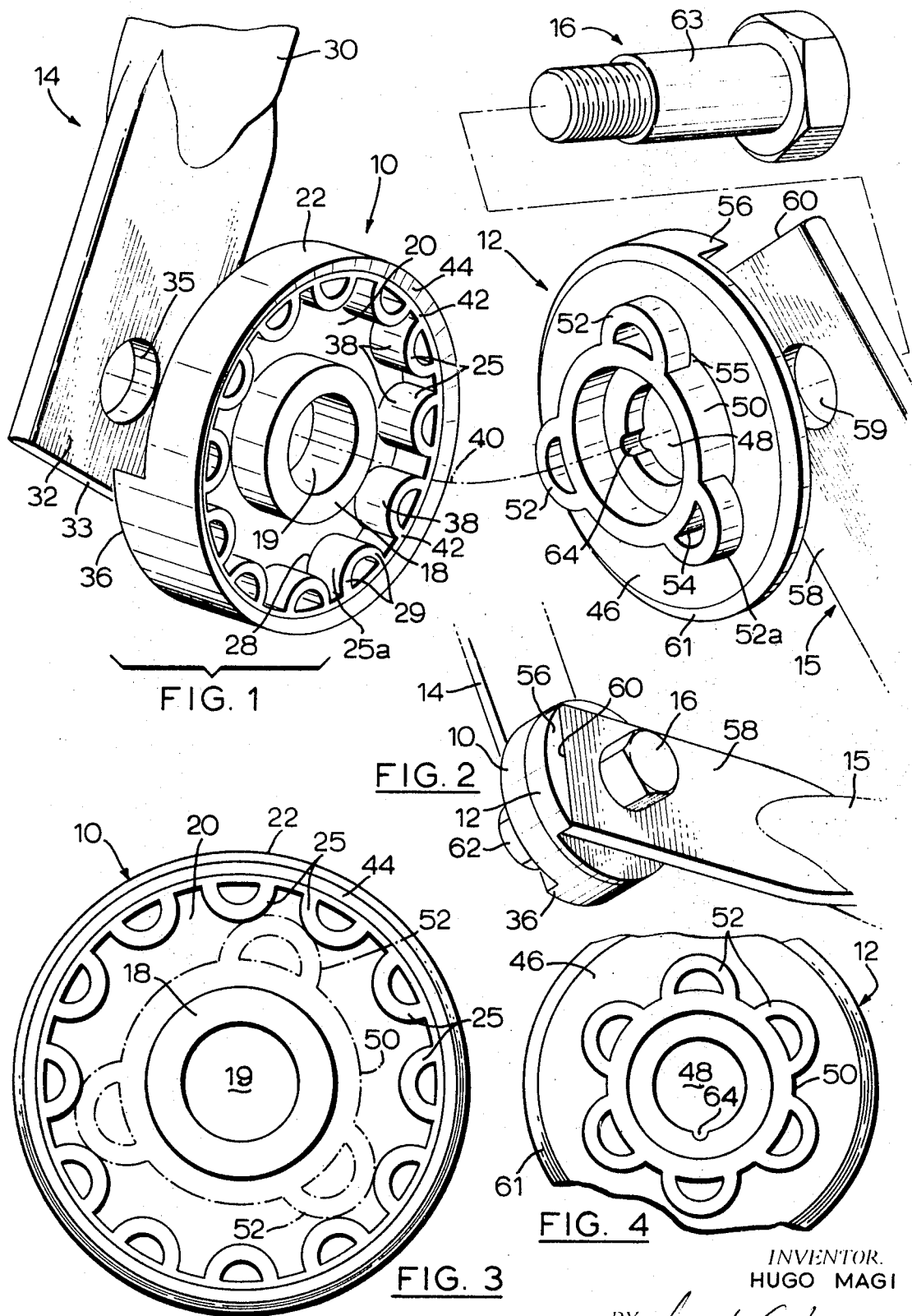

3,586,355

1

HINGE JOINT ASSEMBLIES

This invention relates generally to hinge joint assemblies adapted to hold two pivotally connected structural members in a plurality of angular relationships. The tendency of the hinge joint assembly to hold the structural members in any one of the plurality of angular relationships can be forcibly overcome in order to shift the structural members from one angular relationship to another. The hinge joint assembly of this invention is particularly useful for mounting the horizontally swingable West Coast type of truck mirror on the side of a truck.

It is an object of this invention to provide a hinge joint assembly wherein the construction of the assembly components is such as to preclude the entry of foreign matter into the assembly.

It is a further object of this invention to provide a hinge joint assembly in which axial thrust forces are eliminated.

Accordingly, this invention provides, for use with a hinge joint between two structural members pivotally connected together about a pivot axis, an assembly comprising: a first lock member adapted to be fixed with respect to one of said structural members about said pivot axis, said first lock member having tooth means extending radially inwardly toward said pivot axis, a second lock member adapted to be fixed with respect to the other of said structural members about said pivot axis, said second lock member having tooth means extending radially outwardly from said pivot axis, said lock members having a first relative orientation in which said tooth means mesh with each other, at least one said tooth means being resiliently deformable such that, upon the application of sufficient torque, the mechanical interference between the two means can be overcome, whereby one lock member can be turned with respect to the other lock member to a second relative orientation in which said tooth means mesh with each other.

Two embodiments of this invention are shown in the accompanying drawings, in which like numerals denote like parts throughout the several views, and in which:

FIG. 1 is an exploded perspective view of the components of a hinge joint incorporating the first embodiment of the assembly according to this invention;

FIG. 2 is a perspective view, to a smaller scale than FIG. 1, of the hinge joint of FIG. 1 in the assembled condition;

FIG. 3 is a plan view of one component of the assembly of this invention, showing the position of the other component in broken lines; and FIG. 4 is a broken away plan view of the other component in the second embodiment of this invention.

Turning first to FIG. 1, there is shown a first lock member 10, a second lock member 12, a first structural member 14, a second structural member 15, and a bolt 16. The lock members 10 and 12 are generally circular in shape, and each is adapted, when the hinge joint is assembled, to be fixed with respect to one of the structural members 14 and 15. The first lock member 10 consists of a central boss 18 having a central aperture 19, the boss 18 being integral with a disc 20 which has, at its periphery, an axially extending peripheral flange 22. The peripheral flange 22 extends from the disc 20 in the same direction as does the boss 18. The central aperture 19 extends all the way through the first lock member 10, so that the disc 20 can be considered an annular flange extending outwardly from the boss 18. The peripheral flange 20 integrally supports a plurality of radially inwardly extending teeth 25, all identical, which are spaced at regular intervals around the inner surface of the peripheral flange 22. As can be seen particularly in FIG. 1, each tooth 25 is in the shape of a hollow semicylinder, which is integral with the lock member 10. Tooth 25a, for example, is integral along its curved base 28 with the disc 20, and is integral along its two side edges 29 with the peripheral flange 22. In the embodiment shown, 12 teeth 25 are shown, but it will be appreciated that fewer or more teeth could be provided.

2

The structural member 14 is tubular over most of its length at 30 (broken away), but the end portion of the tubular structural member 14 has been flattened as at 32 to exhibit two parallel plane surfaces. The end surface 33 is square-cut with respect to the portion 32. An aperture 35 is provided to register with the aperture 19. The remote surface of the first lock member 10 (the unseen surface in FIG. 1) is flat except for a raised segment 36 against which the square-cut end 33 is intended to abut when the hinge joint is in its assembled position. The semiannular surfaces 38 of the teeth 25 are all located in a single plane perpendicular to the axis 40 of the first lock member 10. The annular surface 42 is also in the same plane with the semiannular surfaces 38. Outwardly of the annular surface 42, however, the peripheral flange 22 defines a frustoconical surface 44 which diverges outwardly away from the disc 20.

Turning now to the second lock member 12, this will be seen to consist of a disc 46 having a central aperture 48, and a boss 50 extending axially from the disc 46 concentric with the aperture 48. The boss 50 supports three identical, integral teeth 52, each being semicylindrical in shape. Tooth 52a, for example, is integral only at its opposite edges 54 with the boss 50, but is spaced from the disc 46 as can be seen at the gap 55. It is contemplated that both lock members 10 and 12 be molded from plastic material.

The remote side of the disc 46 (the unseen side in FIG. 1) is flat except for a raised segment 56, which is adapted to cooperate with the structural member 15 in the same way that the raised segment 36 cooperates with the structural member 14. The structural member 15 is identical, for the purposes of this description, with the structural member 14, and therefore has a flattened end portion 58, an aperture 59, and a square-cut end 60 which is adapted to abut against the raised segment 56 when the aperture 59 is in alignment with the aperture 48.

The disc 46 has a conical bevel 61 which is complementary with the frustoconical surface 44 and is adapted to seat thereagainst when the lock members 10 and 12 are assembled together.

FIG. 2 shows the hinge joint when it is assembled. A nut 62 (not shown in FIG. 1) is screwed onto the threaded portion of the bolt 16, with suitable washers, etc., after the bolt 16 has been passed through the structural members 14 and 15 and the lock members 10 and 12. The unthreaded portion 63 of the bolt 16 is just long enough to pass through the assembly between the outer surfaces of the structural members 14 and 15, such that the nut 62, when tightened on the bolt 16, does not compress the lock member 10 and 12 together, but merely holds them in engagement without axial compression. It is preferable, where the hinge joint of this invention is intended for exterior use, as with truck mirrors, to orient the assembly with the lock member 10 uppermost, so that rainwater will be unable to enter the assembly between the lock members, due to the downward and outward slope of the frustoconical surface 44.

When the lock members 10 and 12 are assembled together, the teeth 52 mesh with the teeth 25 as shown in FIG. 3. More specifically, each tooth 52 is adapted to project slightly into the space between two adjacent teeth 25, thereby to create mechanical interference between the sets of teeth 25 and 52, the effect of which is to restrain relative rotation as between the two lock members 10 and 12. In accordance with this invention, at least one set of teeth 25 and 52 (and preferably both sets) is made of a resiliently deformable material, and it is therefore possible to exert sufficient differential torque between the lock members 10 and 12 that the mechanical interference between the teeth 25 and the teeth 52 can be overcome, and the one lock member can be turned with respect to the other lock member to another orientation wherein each tooth 52 projects into the space between a differential adjacent pair of teeth 25. Thus, the hinge joint assembly construction described above is such that lock member 12 can be rotated to a plurality of radial orientations with respect to the lock member 10. The provision of hollow cores in those teeth that are of resiliently deformable material is of advantage because it increases the flexibility of the deformable teeth and cuts down the force acting between the sets of teeth during rotation, thereby decreasing the wear on the teeth.

The preferred material for the molding of the lock members 10 and 12 is polycarbonate, although it will be appreciated that a number of other plastic substances can be used as well. Thus, it is preferred that both sets of teeth 25 and 52 be resiliently deformable.

It is not considered essential to remove the central core of the resiliently deformable teeth, as it is possible that certain materials suitable for molding the lock members 10 and 12 may be sufficiently resilient not to require the provision of hollow teeth.

In FIG. 4 is shown the arrangement of teeth 52 for the second embodiment of this invention, wherein it will be seen that six teeth are provided, spaced uniformly around the boss 50 at angular separations of 60°. Again, the teeth 52 are separated from the disc 46. The number of teeth provided is dependent upon a number of factors, among which are: the characteristics of the material employed, the required resistance to rotation away from the "at-rest" positions, and the permissible wear of the material of the teeth.

The aperture 48 has an axial groove 64 cut in its wall, the purpose of which is to permit the egress of rainwater that may become trapped between the lock members 10 and 12.

While preferred embodiments of this invention have been disclosed herein, those skilled in the art will appreciate that changes and modifications may be made therein without departing from the spirit and scope of this invention as defined in the appended claims.

What I claim as my invention is:

1. For use with a hinge joint between two structural members pivotally connected together about a pivot axis, an assembly comprising:
    a first lock member adapted to be fixed with respect to one of said structural members about said pivot axis, said first lock member having a plurality of rounded, radially inwardly extending teeth spaced equidistantly from said pivot axis,
    a second lock member adapted to be fixed with respect to the other of said structural members about said pivot axis, said second lock member having a plurality of rounded, radially outwardly extending teeth spaced equidistantly from said pivot axis,
    said lock members having a first relative orientation in which said pluralities of teeth mesh with each other, the teeth of both lock members being resiliently deformable such that, upon the application of sufficient torque, the mechanical interference between the meshing teeth can be overcome, whereby one lock member can be turned with respect to the other lock member to a second relative orientation in which said pluralities of teeth mesh with each other.

2. An assembly as claimed in claim 1, in which said first lock member comprises a disc having a central aperture and an integral, axially extending peripheral flange integrally supporting said radially inwardly extending teeth, and in which said second lock member comprises a disc having a central aperture and an integral, axially extending, coaxial boss integrally supporting said radially outwardly extending teeth.

3. An assembly as claimed in claim 2, in which said radially inwardly extending teeth are uniformly spaced around said peripheral flange, and in which said radially outwardly extending teeth are uniformly spaced around said coaxial boss.

4. An assembly as claimed in claim 3, in which each of said radially outwardly extending teeth constitutes a portion of a hollow cylinder, is integral only with said boss, and is spaced from said disc of said second lock member.

5. An assembly as claimed in claim 2, in which the side of each disc remote from its teeth is formed to be complementary with a portion of the structural member with respect to which that disc is intended to be fixed.

6. For use with a hinge joint between two structural members pivotally connected together about a pivot axis, an assembly comprising:
    a first lock member adapted to be fixed with respect to one of said structural members about said pivot axis, said first lock member having a plurality of rounded, radially inwardly extending teeth spaced equidistantly from said pivot axis, said first lock member being an integral element,
    a second lock member adapted to be fixed with respect to the other of said structural members about said pivot axis, said second lock member having a plurality of rounded, radially outwardly extending teeth spaced equidistantly from said pivot axis, said second lock member being an integral element,
    said lock members having a first relative orientation in which said pluralities of teeth mesh with each other, at least one said plurality of teeth being resiliently deformable such that, upon the application of sufficient torque, the mechanical interference between the meshing teeth can be overcome, whereby one lock member can be turned with respect to the other lock member to a second relative orientation in which said pluralities of teeth mesh with each other, all resilient teeth being hollow whereby to increase the resilience of the teeth.

7. An assembly as claimed in claim 6, in which all teeth are resilient.

8. A hinge joint assembly comprising:
    two structural members pivoted together about a pivot pin element,
    a first lock member adapted to be fixed with respect to one of said structural members about said pivot axis, said first lock member having a plurality of rounded, radially inwardly extending teeth spaced equidistantly from said pivot axis,
    a second lock member adapted to be fixed with respect to the other of said structural members about said pivot axis, said second lock member having a plurality of rounded, radially outwardly extending teeth spaced equidistantly from said pivot axis,
    said lock members having a first relative orientation in which said pluralities of teeth mesh with each other, the teeth of both lock members being resiliently deformable such that, upon the application of sufficient torque, the mechanical interference between the meshing teeth can be overcome, whereby one lock member can be turned with respect to the other lock member to a second relative orientation in which said pluralities of teeth mesh with each other.